United States Patent
Schlemmer et al.

(10) Patent No.: US 6,877,935 B2
(45) Date of Patent: Apr. 12, 2005

(54) CUTTING TOOL AND INDEXABLE TIP

(75) Inventors: Armin Schlemmer, Kapfenberg (AT); Gerhard Melcher, Frohnleiten (AT)

(73) Assignee: Böhlerit Ges. M.B.H. & Co. KG, Kapfenberg (AT)

( * ) Notice: Subject to any disclaimer, the term of this patent is extended or adjusted under 35 U.S.C. 154(b) by 27 days.

(21) Appl. No.: 10/045,042

(22) Filed: Jan. 15, 2002

(65) Prior Publication Data

US 2002/0094245 A1 Jul. 18, 2002

(30) Foreign Application Priority Data

Jan. 18, 2001 (AT) .......................................... A 88/2001

(51) Int. Cl.⁷ .............................. B23B 27/10; B23C 5/20
(52) U.S. Cl. ........................ 407/66; 407/114; 407/113
(58) Field of Search .................. 407/66, 111, 112, 407/113, 114, 115, 116, 117, 11; 408/233, 59

(56) References Cited

U.S. PATENT DOCUMENTS

| | | | |
|---|---|---|---|
| 3,289,272 A | | 12/1966 | Stier |
| 3,859,699 A | * | 1/1975 | Lindskog ..................... 407/66 |
| 4,047,826 A | | 9/1977 | Bennett |
| 4,558,975 A | * | 12/1985 | Hale ........................... 407/113 |
| 4,776,732 A | * | 10/1988 | Hale ........................... 407/114 |
| 4,844,669 A | | 7/1989 | Tsujimura et al. |
| 5,052,863 A | * | 10/1991 | Satran ........................ 407/113 |
| 5,207,748 A | * | 5/1993 | Katbi et al. .................. 407/114 |
| 5,460,464 A | * | 10/1995 | Arai et al. ................... 407/114 |
| 5,688,083 A | * | 11/1997 | Boianjiu ...................... 407/113 |
| 5,695,303 A | * | 12/1997 | Boianjiu et al. ............. 407/114 |
| 5,876,154 A | * | 3/1999 | Enderle ....................... 407/114 |
| 6,142,716 A | * | 11/2000 | Jordberg et al. ............. 407/114 |
| 6,224,300 B1 | * | 5/2001 | Baxivanelis et al. ........ 407/114 |
| 6,464,433 B1 | * | 10/2002 | Shaffer ........................ 407/66 |
| 6,540,447 B2 | * | 4/2003 | Nagata et al. ............... 407/35 |

FOREIGN PATENT DOCUMENTS

| | | | |
|---|---|---|---|
| DE | 2733705 | 2/1978 | |
| EP | 642859 | 3/1995 | |
| WO | WO9851438 | * 11/1998 | ........... B32B/27/14 |

* cited by examiner

Primary Examiner—A. L. Wellington
Assistant Examiner—Dana Ross
(74) Attorney, Agent, or Firm—Greenblum & Bernstein, P.L.C.

(57) ABSTRACT

Cutting tool for drilling and turning. The cutting tool includes a base body having a clamping part and a working part axially spaced from each other, and an indexable tip, releasably connected to the working part, having a hexagonal shape having at least one circumferential cutting edge and obtuse and acute corner angles.

39 Claims, 3 Drawing Sheets

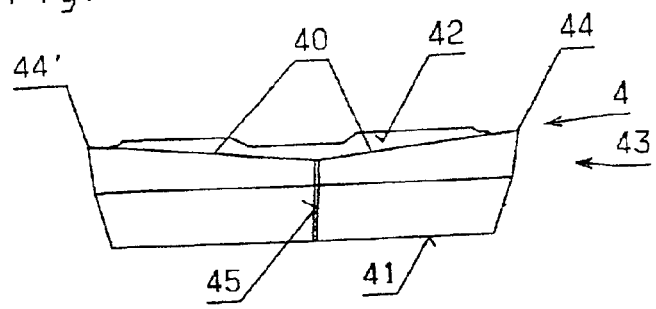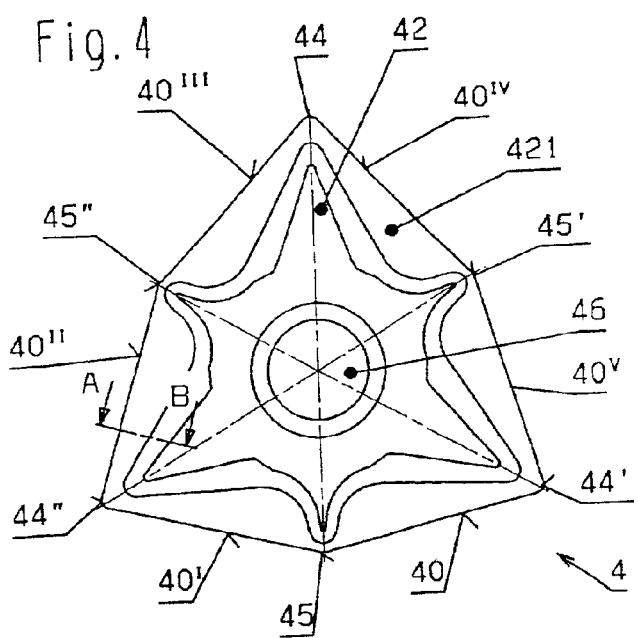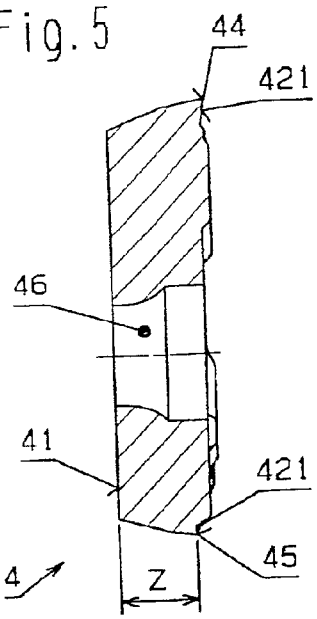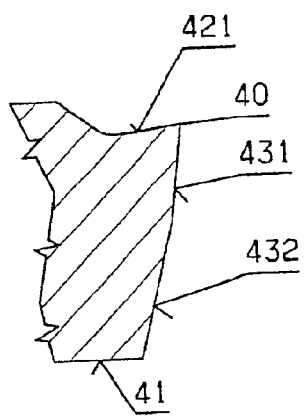

CUTTING TOOL AND INDEXABLE TIP

CROSS-REFERENCE TO RELATED APPLICATIONS

The present application claims priority under 35 U.S.C. §119 of Austrian Patent Application No. 88/2000, filed Jan. 18, 2001, the disclosure of which is expressly incorporated by reference herein in its entirety.

BACKGROUND OF THE INVENTION

1. Field of the Invention

The present invention relates to a cutting tool for drilling and turning. The tool includes a base body having at least one coolant bore, as well as a clamping part and an essentially cylindrically formed working part following the clamping part in an axial direction. An indexable tip, which is releasably connected to the working part at its end opposite the clamping part, includes, in plan view, circumferential cutting edges. The working part has a flute running in the direction of the tool axis and a form-locking seat for the indexable tip with cutting edges slightly projecting.

Further, the invention relates to an indexable tip for a cutting tool for machining materials, in particular metals and alloys. The indexable tip is limited by a flat supporting area, a face opposite the supporting area and open spaces connecting the supporting area and the face. Also, an attachment device mounting can be optionally embodied as a center hole, whereby, in the plan view of the indexable tip, six cutting edges run circumferentially.

2. Discussion of Background Information

Cutting tools of the specified type, which can be used for different machinings, have an extraordinarily high technical and economic importance for the manufacture of work pieces, particularly those made of metal, in plant and machine construction. In a relatively short time, such cutting tools render possible the manufacture of a large number of work pieces, particularly those with complex geometric shapes, and can essentially ensure adequate dimensional accuracy and surface quality thereby. When several machining operations are performed with a single cutting tool, the machining time can be kept short, because expensive changeover times for exchanging cutting tools do not apply. In addition, with a computer-controlled machining of parts, the programming effort can be substantially reduced.

To meet the requirement for economic efficiency for tools, the achievement of as long a tool life as possible in practical use is required. For this reason, with cutting tools of the type mentioned at the outset, cutting attachments made of sintered materials featuring circumferential cutting edges are used. The wear on the cutting edges or their length of use is influenced by several factors, e.g., a distribution of forces in the tip when in contact with the usually rotating work piece and/or the transfer of force from the tip to the base body.

In the production of work pieces of the highest quality, an appropriately ensured stability and a low tendency of the tool to vibrate with simultaneously good cutting action are necessary.

In order to further achieve the highest cost-effectiveness and surface quality, the cutting tools of the type mentioned at the outset should permit a variety of possible methods for machining work pieces, as well as feature the lowest possible tool wear, even in high capacity operation, and at the same time ensure a desired dimensional accuracy of the machined surfaces. However, the realization of such a combination of requirements is difficult to achieve.

In the published patent application DE 2733705, a cutting tool equipped with an indexable tip is described that is suitable for drilling and turning and whose indexable tip features four usable cutting edges. Two cutting edges each are located on the upper side and the underside of an indexable tip that is approximately rhomboid in plan view. The indexable tip is shaped such that a change of cutting edges occurs by turning, although the supporting area of the tip is reduced, by which the stability and thus also the surface quality achieved can be substantially impaired.

In EP 0642859 B1 another cutting tool for drilling into the solid and turning is suggested. The cutting tool includes essentially a base body and an indexable tip that is rhomboid in plan view, featuring alternately obtuse and acute angles, with four cutting edges rounded off at the corners and located on the upper side, whereby the tip is connected to the base body such that the front cutting edge in plan view runs vertically to the tool axis of rotation, does not deviate from the vertical more than a maximum of about 0.5°, and does not extend more than about 10% beyond the tool axis of rotation at the transition to the corner rounding. It is further provided that in the front view of the tool, the cutting edge intersects the drill longitudinal axis or features a maximum spacing of about 2% of the drill diameter. Such a cutting tool should feature improved stability and render possible a more even bore base in pocket bores. However, it can be considered detrimental for the tool that can be favorably used for drilling, that with turning and, in particular, an inside turning and die sinking with larger dimensions the largest chip width is limited to half the diameter of the machining section of the tool. Further, after a single turn of the indexable tip, this must be replaced for cutting edge wear and for cutting edge renewal.

The known cutting tools for drilling into the solid and for turning have the disadvantage in common, that the only machining widths to be achieved with them correspond essentially to the length of the face cutting edge and thus half the diameter of the machining part of the tool. Although a drilling outside the center optionally allows a slight increase of the bore diameter, this is limited to about 10% of the same. Experience has shown in operation that variable bore diameters even beyond this size are required, which, however, can only be achieved through the use of several different cutting tools or through an expensive machining technology. This is linked to a considerable loss of working time.

In addition, the cutting tools known from prior art are designed such that in plan view the indexable tip is mounted almost completely on one side of the base body or machining part of the tool between the surface and the axis of rotation. The uneven distribution of forces thus caused can result in vibrations and stability problems, through which the tool life of the four cutting edges is reduced, and the surface and work piece quality are adversely affected. It has also been shown that with cutting tools with cutting edges located on the upper side, because of the approximately square shapes of such indexable tips, an incorrect orientation of the same in the tip seat and a subsequent defective attachment can easily occur, particularly if tool users are under pressure, and thus hectic work methods and carelessness often result. Although attempts are made to prevent defective attachment and the consequent dangers for user and tool by additionally attaching signs on such indexable tips, such dangers cannot be ruled out.

SUMMARY OF THE INVENTION

The present invention remedies the above problems and aims to create a cutting tool for drilling and turning to meet high safety requirements with increased stability and the same tool life. With this cutting tool, an increased width of machining is rendered possible and variable bore diameters within a wide range can be attained.

The instant invention also includes an indexable tip that is suitable for use in a cutting tool for drilling into the solid with variable diameters and for turning and that features a long tool life.

Accordingly, with a generic cutting tool, the indexable tip connected to the working part of the tool features, in plan view, a hexagonal shape with alternate obtuse and acute corner angles and six straight cutting edges. The largest width of the indexable tip is at least about 0.92 times the diameter of the working part.

The advantages of the invention can be seen in particular in that with a cutting tool according to the invention, a drilling outside the center or axis is rendered possible and variable bore diameters can be attained. Bores can therefore be made in parts, and the diameter of these bores can extend up to double the diameter of the working part of the tool.

The design of the drilling tool is made advantageously such that three cutting edges of the indexable tip can be activated in terms of machining technology and that the trajectory of a cutting edge or a part of the same, projects slightly beyond the outer contour of the working part during the rotation of the tool.

As drilling with increased machining width of the material and the same turning operations are likewise possible, in operation the number of machining steps and/or a complicated tool change can be advantageously reduced. The increased functionality of a cutting tool according to the invention therefore also causes the effect of improved cost-effectiveness.

A further advantage can be seen in that, with a cutting tool according to the invention, the number of cutting edges is increased by two compared with known generic cutting tools, and thus the tool life or the machining volume are increased by at least about 50%. This can also be attributed to a preferred greater length of the cutting edges of the indexable tip.

Another advantage lies in a more stable positioning of the indexable tip. With a cutting tool according to the invention, the indexable tip is attached so that the enlarged supporting area in plan view comes to rest with considerable portions on both sides of the tool axis of rotation in the working part. A one-sided strain and a deformation of the cutting edge through elastic bending of the tool working part in operation is efficiently avoided. At the same time, according to the invention, with the same length of cutting edges, the supporting area or supporting surface of the indexable tip is enlarged, through which a favorable low contact pressure and a high stability are achieved. This allows the production of shaped bodies of the highest dimensional accuracy and surface quality with high cutting capacities.

In addition to the above advantages, a cutting tool according to the invention offers a favorably increased assembly safety. As far as the position of the cutting edges is concerned, there are indeed several, but only equivalent, possibilities for fitting them in the tip seat, due to the symmetry of the indexable tip. The result is that no safety hazard arising from false assembly occurs, even with hectic handling.

In a further development of a cutting tool according to the invention, the base body features one or more bores for inserting coolant and/or lubricants, whereby the exit of the coolant channel is directed at the indexable tip and in plan view thereby forms an angle of about 15° to 75°, preferably about 25° to 45°, with the tool axis. Due to this design, hot chips can be carried out and also the indexable tip, in particular the cutting edges and parts adjacent to the cutting edges, can be cooled and frictional forces can be reduced. In other words, the chip removal can be improved by a coolant, whereby it has proved particularly favorable for the durability of the cutting edges if the exit of the coolant channel is directed at the indexable tip and thereby in plan view forms an angle of about 15° to 75°, preferably about 25° to 45°, with the tool axis.

For the further improvement of the chip removal, it has proved advantageous if the flute running in the direction of the tool axis is embodied with twist.

In a development of the invention to increase the stability of the attachment the indexable tip features a center hole and is connected to the base body via a screw.

In order to achieve optimum dimensional accuracy and the same surface quality of the machining, it was judged advantageous if the cutting edges of the indexable tip in plan view form an angle of about 88°±1.7°, preferably about 88°±0.5°, in particular about 88°±0.3°, at their acute-angled corners.

In order to achieve a flat drilling base with simultaneous high stability of the cutting tool and a good freedom of movement during drilling, it has proved favorable if in plan view a front cutting edge of the indexable tip forms an angle of about 89.8°±0.5° with the tool axis of rotation.

According to another aspect of the invention, an indexable tip is prepared for a cutting tool for machining materials, in particular metals and alloys, by drilling and turning. The indexable tip, limited by a flat supporting area, a face opposite the supporting area, and open spaces connecting the supporting area and the face, features an attachment device mounting, whereby, in the plan view of the indexable tip, six cutting edges run circumferentially. In this manner, straight cutting edges form alternately acute-angled corners and obtuse-angled corners, whereby the vertical distance of the cutting edges from the base area features a minimum in the area of the obtuse-angled corners.

The advantages of an indexable tip according to the invention are to be seen in particular in that through its use in a cutting tool, variable bore diameters can be attained in drilling outside the center of the tool and that an extraordinarily high cost-effectiveness is given by the availability of six usable cutting edges. The offset cutting edge can have an effective machining action over the entire width of the indexable tip thereby.

In an advantageous development, the cutting edges of an indexable tip according to the invention form an angle of about 88°±1.7°, preferably about 88°±0.5°, in particular about 88°±0.3°, at their acute-angled corners, as a result of which a high dimensional accuracy with a minimizing of the chip separation vibrations can be achieved, in particular during drilling and die sinking.

To attain a high cutting action, it can be advantageous if the cutting edges of an indexable tip according to the invention are embodied inclined to the supporting area at an angle of about 2° to 10°, preferably about 4° to 8°, in particular about 7°±0.5°.

The cutting capacity can be increased if the part of the face of an indexable tip according to the invention immediately bordering the cutting edge forms an angle of about 2° to 18°, preferably about 4° to 12°, in particular about 5° to 10°, with supporting area. This corresponds to a particularly advantageous establishment of the rake angle as far as the cutting action and chip removal are concerned.

In a further advantageous development, an indexable tip according to the invention is characterized by open spaces that form an angle of about 5° to 12°, preferably about 6° to 11°, and in particular about 7°±0.5°, with the normal to the supporting area at the cutting edges or that are optionally divided into at least two sections of which the first, bordering the cutting edges, forms an angle of about 5° to 12°, preferably about 6° to 11°, and in particular about 7°±0.5°, and the last of which, bordering the supporting area, forms an angle of about 12° to 25°, preferably about 14° to 22°, and in particular about 15°±0.5°, with a straight line normal to the supporting area. Through this development, a particularly good freedom of movement is achieved when used in a cutting tool according to the invention.

To establish a desired surface roughness, an indexable tip according to the invention can feature rounded-off corners with a specified corner radius.

The instant invention is directed to a cutting tool for drilling and turning that includes a base body having a clamping part and a working part axially spaced from each other, and an indexable tip, releasably connected to the working part, having a hexagonal shape with at least one circumferential cutting edge and obtuse and acute corner angles.

According to a feature of the present invention, the working part can be essentially cylindrical.

In accordance with another feature of the invention, the indexable tip may be positioned at an end of the working part remote from the clamping part.

The working part can include a flute running in a direction of a tool axis and a form-locking seat for the indexable tip. When the indexable tip is seated on the working part, at least one cutting edge can slightly project from the working part. The flute running in a direction of the tool axis is formed with a twist.

The hexagonal shape of the indexable tip can include alternately obtuse and acute corner angles and six straight cutting edges. A greatest width of the indexable tip may be at least about 0.92 times a diameter of the working part.

Moreover, the at least one cutting edge can include three cutting edges, and a trajectory of at least a part of one of the three cutting edges may project slightly beyond an outer contour of the working part.

The base body may include at least one bore for inserting at least one of coolant and lubricant, and an exit of the at least one bore can be directed at the indexable tip. The exit of the at least one bore may be obliquely arranged relative to a tool axis. The exit of the at least one bore can be arranged at an angle between about 15° and 75° to the tool axis. Further, the exit of the at least one bore may be arranged at an angle between about 25° and 45° to the tool axis.

The indexable tip may include a center hole and the center hole of the indexable tip can be eccentrically positioned outside a center of the working part.

The at least one cutting edge can include a plurality of cutting edges arranged to form acute angled corners having an angle of about 88°±1.7°. Further, the at least one cutting edge may include a plurality of cutting edges arranged to form acute angled corners having an angle of about 88°±0.3°. A front cutting edge of the indexable tip may form an angle of about 89.8°±0.5° with an axis of tool rotation.

The present invention is directed to an indexable tip for a cutting tool for the machining of materials. The indexable tip includes a flat supporting area and a face opposite the supporting area, such that the flat supporting area and the face are arranged to form open spaces coupling the supporting area and the face. Six circumferential cutting edges are arranged to form acute and obtuse angled corners, and a vertical distance of the cutting edges from the supporting area in a region of the obtuse-angled corners is a minimum.

According to a feature of the invention, the cutting tool can be structured for the machining of metals and alloys.

In accordance with another feature of the present invention, an attachment device can be formed as a center hole.

The cutting edges can be arranged to form alternately acute-angled corners and obtuse-angled corners.

Moreover, the cutting edges can form acute angled corners having an angle of about 88°±1.7°, preferably about 88°±0.5°, and most preferably about 88°±0.3°.

The cutting edges can be oriented at an angle of between about 2° and 10° to the supporting area, preferably oriented at an angle between about 4° and 8° to the supporting area, and most preferably oriented at an angle of about 7°±0.5° to the supporting area.

A part of the face immediately bordering the cutting edge can form an angle of between about 2° and 18° with the supporting area, preferably an angle of between about 4° and 12° with the supporting area, and most preferably an angle of between about 5° and 10° with the supporting area.

The open spaces may form an angle of between about 5° and 12° with a straight line normal to the supporting area at the cutting edges, preferably an angle of between about 6° and 11° with a straight line normal to the supporting area at the cutting edges, and most preferably an angle of about 7°±0.5° with a straight line normal to the supporting area at the cutting edges.

Moreover, the open spaces can be divided into at least two sections including a first section, bordering the cutting edges, forming an angle of between about 5° and 12°, and a second section, bordering the supporting area, forming an angle of between about 12° to 25° with a straight line normal to the supporting area. The first section may form an angle of between about 6° and 11°, and more preferably an angle of about 7°±0.5°. Further, the second section may form an angle of between about 14° and 22°, and more preferably an angle of about 15°±0.5°.

In accordance with still yet another feature in accordance with the instant invention, the corners can be rounded off.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 3 illustrates an indexable tip according to the invention in front view;

FIG. 4 illustrates an indexable tip according to the invention in plan view;

FIG. 5 illustrates an indexable tip according to the invention in side view;

FIG. 6 illustrates the section along line AB in FIG. 4;

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
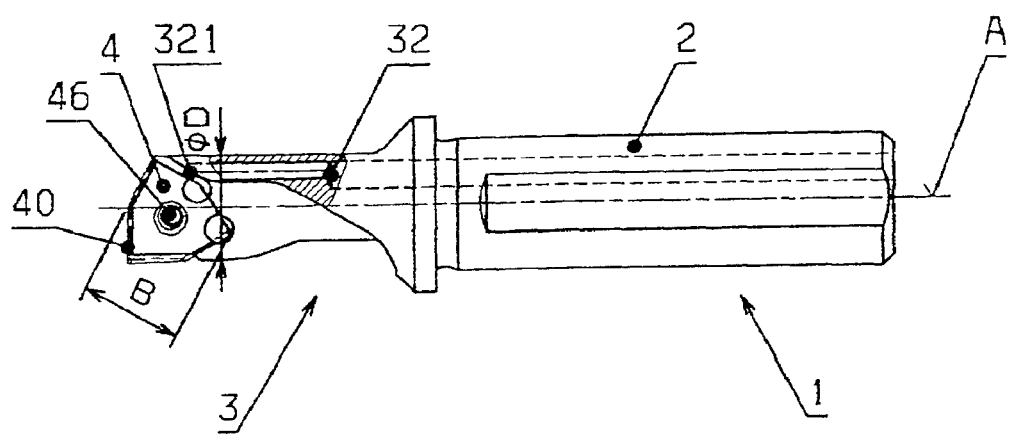
FIG. 1 illustrates a cutting tool according to the invention in plan view.
Figure 2:
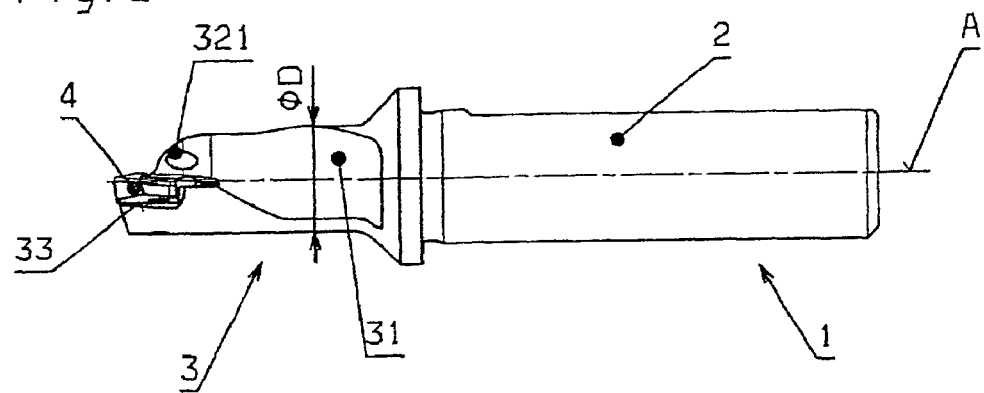
FIG. 2 illustrates a cutting tool according to the invention in side view.

In FIG. 1, a cutting tool according to the invention is shown in plan view by way of example. Such a cutting tool includes essentially a base body 1 with a clamping part 2 and a working part 3 following it in an axial direction. A coolant channel 32 passes through base body 1 in the direction of the axis of rotation A and can feed coolant to an exit 321. The coolant can be allowed to flow through exit 321 to the front region of working part 3 for cooling and/or chip removal. Working part 3 features a form-locking seat 33 for accepting an indexable tip 4. Indexable tip 4 features, e.g., a hexagonal shape in plan view with alternately obtuse and acute corner angles mounted in form-locking seat 33 such that a width B of the largest dimension of indexable tip 4 corresponds approximately to a diameter D of working part 3 and three cutting edges project slightly. An active front cutting edge 40 in plan view stands at an angle of about 90° to the axis of rotation A. FIG. 2 shows a side view of a cutting tool according to the invention. The design of a twisted flute 31 running in the direction of axis of rotation A renders possible an advantageous chip removal.

FIG. 3 shows, by way of example, a front view of indexable tip 4 according to the invention, which is formed by a flat supporting area 41, a face 42 opposite supporting area 41, and open spaces 43 connecting supporting area 41 and face 42. The plan view of indexable tip 4 according to the invention is illustrated in FIG. 4. Indexable tip 4 features straight cutting edges 40, 40$^I$, 40$^{II}$, 40$^{III}$, 40$^{IV}$, 40$^V$, which in plan view form alternately acute-angled corners 44, 44', 44", and obtuse-angled corners 45, 45', 45" and whose vertical distance from supporting area 41 in the region of obtuse-angled corners 45, 45', 45" exhibits a minimum. FIG. 5 shows a corresponding side view. An attachment device mounting embodied, e.g., as a center hole 46, passes through indexable tip 4, through which the mounting of a screw is rendered possible. FIG. 6 shows a section along the line AB depicted in FIG. 4. Part 421 of the face 42 adjacent to the cutting edges is inclined with respect to supporting area 41, through which a good cutting action can be achieved during use in a cutting tool. Further, surfaces 431 and 432 of open space 43 are arranged to connect supporting area 41 to cutting edge 40.

Figure 7:
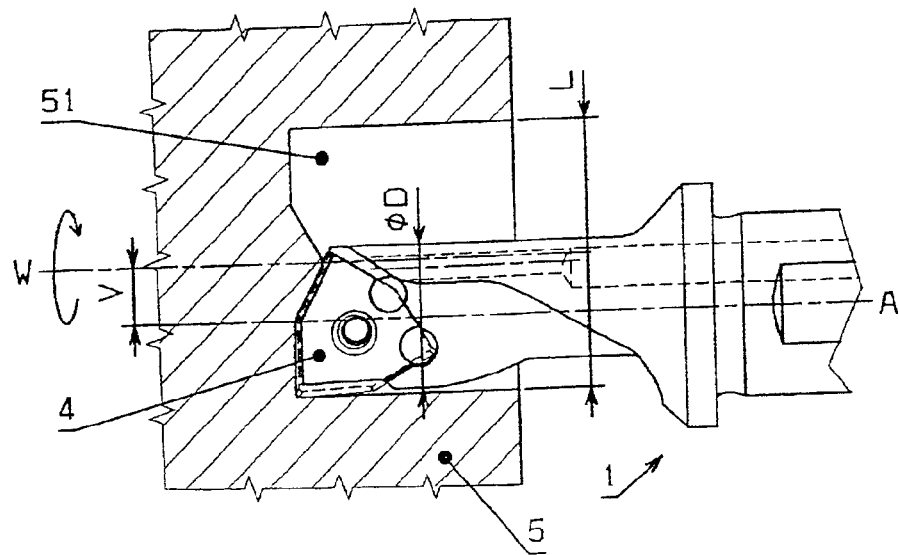
FIG. 7 illustrates the making of a drilled hole in a work piece by drilling outside the center with a cutting tool according to the invention.
Figure 8:
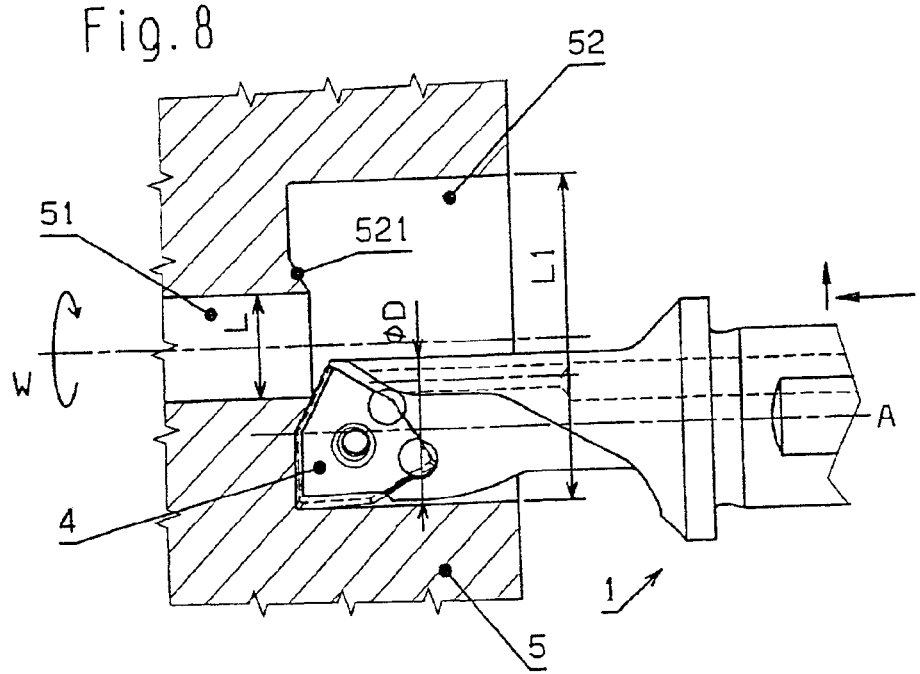
FIG. 8 illustrates the making of a pocket bore in a work piece using a cutting tool according to the invention.

FIG. 7 shows an exemplary use of cutting tool 1 according to the invention concerning the making of a bore 51 in a work piece 5. Work piece 5 rotating around a work piece axis W is moved straight forward in the direction of cutting tool 1, through which chips are separated from work piece 5 by cutting tool 1. A diameter L of bore 51 is essentially determined thereby by the offset V of work piece axis W and axis of rotation A of cutting tool 1. In FIG. 8 a further use of cutting tool 1 according to the invention is illustrated by way of example. In work piece 5, bore 51 is made with a first diameter L, and a flat pocket bore can be achieved in a simple manner by making a bore with a diameter L1, which is greater than first diameter L, by drilling outside the center and subsequently separating hole plug 521 of second bore 52 by turning.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A cutting tool for drilling and turning, comprising:
   a base body comprising a clamping part and a working part axially spaced from each other;
   an indexable tip, releasably connected to said working part, comprising a hexagonal shape having at least one circumferential cutting edge, to support surface and obtuse and acute corner angles; and
   a thickness of said indexable tip from said support surface to upper extents of said acute corner angles opposite said support surface is greater than a thickness of said indexable tip from said support surface to upper extents of said obtuse corner angles opposite said support surface.

2. The cutting tool in accordance with claim 1, wherein said working part is essentially cylindrical.

3. The cutting tool in accordance with claim 1, wherein said indexable tip is positioned at an end of said working part remote from said clamping part.

4. The cutting tool in accordance with claim 1, wherein said working part comprises a flute running in a direction of a tool axis and a form-locking seat for said indexable tip.

5. The cutting tool in accordance with claim 4, wherein, when said indexable tip is seated on said working part, at least one cutting edge slightly projects from said working part.

6. The cutting tool in accordance with claim 4, wherein said flute running in a direction of said tool axis is formed with a twist.

7. The cutting tool in accordance with claim 1, wherein said hexagonal shape of said indexable tip comprises alternately obtuse and acute corner angles and six straight cutting edges.

8. The cutting tool in accordance with claim 7, wherein a greatest width of said indexable tip is at least about 0.92 times a diameter of said working part.

9. The cutting tool in accordance with claim 1, wherein said at least one cutting edge comprises three cutting edges, and wherein a trajectory of at least a part of one of said three cutting edges projects slightly beyond an outer contour of said working part.

10. The cutting tool in accordance with claim 1, wherein said base body comprises at least one bore for inserting at least one of coolant and lubricant, and an exit of said at least one bore is directed at said indexable tip.

11. The cutting tool in accordance with claim 10, wherein said exit of said at least one bore is obliquely arranged relative to a tool axis.

12. The cutting tool in accordance with claim 11, wherein said exit of said at least one bore is arranged at an angle between about 15° and 75° to said tool axis.

13. The cutting tool in accordance with claim 12, wherein said exit of said at least one bore is arranged at an angle between about 25° and 45° to said tool axis.

14. The cutting tool in accordance with claim 1, wherein said indexable tip comprises a center hole and the center hole of said indexable tip is eccentrically positioned outside a center of said working part.

15. The cutting tool in accordance with claim 1, wherein said at least one cutting edge comprises a plurality of cutting edges arranged to form acute angled corners having an angle of about 88°±1.7°.

16. The cutting tool in accordance with claim 15, wherein said at least one cutting edge comprises a plurality of cutting edges arranged to form acute angled corners having an angle of about 88°±0.3°.

17. The cutting tool in accordance with claim 1, wherein a front cutting edge of said indexable tip forms an angle of about 89.8°±0.5° with an axis of tool rotation.

18. An indexable tip for a cutting tool for the machining of materials, comprising:
 a flat supporting area;
 a face opposite said supporting area;
 said flat supporting area and said face being arranged to form open spaces coupling said supporting area and said face; and
 six circumferential cutting edges arranged to form acute and obtuse angled corners,
 wherein a vertical distance from said supporting area to said cutting edges located at said obtuse-angled corners is less than a vertical distance from said supporting area to said cutting edges located at said acute-angled corners.

19. The indexable tip in accordance with claim 18, wherein said cutting tool is structured for the machining of metals and alloys.

20. The indexable tip in accordance with claim 18, further comprising an attachment device formed as a center hole.

21. The indexable tip in accordance with claim 18, wherein said cutting edges are arranged to form alternately acute-angled corners and obtuse-angled corners.

22. The indexable tip in accordance with claim 18, wherein said cutting edges form acute angled corners having an angle of about 88°±1.7°.

23. The indexable tip in accordance with claim 22, wherein said acute angled corners are about 88°±0.5°.

24. The indexable tip in accordance with claim 22, wherein said acute angled corners are about 88°±0.3°.

25. The indexable tip in accordance with claim 18, wherein said cutting edges are oriented at an angle of between about 2° and 10° to said supporting area.

26. The indexable tip in accordance with claim 25, wherein said cutting edges are oriented at an angle between about 4° and 8° to said supporting area.

27. The indexable tip in accordance with claim 25, wherein said cutting edges are oriented at an angle of about 7°±0.5° to said supporting area.

28. The indexable tip in accordance with claim 18, wherein a part of said face immediately bordering said cutting edge forms an angle of between about 2° and 18° with said supporting area.

29. The indexable tip in accordance with claim 28, wherein a part of said face immediately bordering said cutting edge forms an angle of between about 4° and 12° with said supporting area.

30. The indexable tip in accordance with claim 28, wherein a part of said face immediately bordering said cutting edge forms an angle of between about 5° and 10° with said supporting area.

31. The indexable tip in accordance with claim 18, wherein the open spaces form an angle of between about 5° and 12° with a straight line normal to said supporting area at said cutting edges.

32. The indexable tip in accordance with claim 31, wherein the open spaces form an angle of between about 6° and 11° with a straight line normal to said supporting area at said cutting edges.

33. The indexable tip in accordance with claim 31, wherein the open spaces form an angle of about 7°±0.5° with a straight line normal to said supporting area at said cutting edges.

34. The indexable tip in accordance with claim 18, wherein the open spaces are divided into at least two sections comprising a first section, bordering the cutting edges, forming an angle of between about 5° and 12°, and a second section, bordering said supporting area, forming an angle of between about 12° to 25° with a straight line normal to said supporting area.

35. The indexable tip in accordance with claim 34, wherein said first section forms an angle of between about 6° and 11°.

36. The indexable tip in accordance with claim 34, wherein said first section forms an angle of about 7°±0.5°.

37. The indexable tip in accordance with claim 34, wherein said second section forms an angle of between about 14° and 22°.

38. The indexable tip in accordance with claim 34, wherein said second section forms an angle of about 15°±0.5°.

39. The indexable tip in accordance with claim 18, wherein said corners are rounded off.

* * * * *